United States Patent
Weggenmann

(10) Patent No.: US 12,400,030 B2
(45) Date of Patent: Aug. 26, 2025

(54) PRIVACY ARRANGEMENT FOR DIRECTIONAL DATA

(71) Applicant: SAP SE, Walldorf (DE)

(72) Inventor: Benjamin Weggenmann, Karlsruhe (DE)

(73) Assignee: SAP SE, Walldorf (DE)

( * ) Notice: Subject to any disclaimer, the term of this patent is extended or adjusted under 35 U.S.C. 154(b) by 260 days.

(21) Appl. No.: 17/890,682

(22) Filed: Aug. 18, 2022

(65) Prior Publication Data

US 2024/0061956 A1    Feb. 22, 2024

(51) Int. Cl.
    *G06F 21/62*      (2013.01)

(52) U.S. Cl.
    CPC .................................. *G06F 21/6254* (2013.01)

(58) Field of Classification Search
    CPC ........................................................ G06F 21/62
    See application file for complete search history.

(56) References Cited

U.S. PATENT DOCUMENTS

| | | | | |
|---|---|---|---|---|
| 9,807,229 | B1* | 10/2017 | Gutierrez, Jr. | ........ H04W 24/04 |
| 2001/0055975 | A1* | 12/2001 | McDonnell | ............. H04L 67/52 |
| | | | | 455/456.6 |
| 2007/0136027 | A1* | 6/2007 | Dwork | ................ G06F 21/6245 |
| | | | | 702/180 |
| 2008/0132251 | A1* | 6/2008 | Altman | .............. G06Q 30/0268 |
| | | | | 455/457 |
| 2009/0138402 | A1* | 5/2009 | Chan | ....................... G06F 21/62 |
| | | | | 705/51 |
| 2010/0125730 | A1* | 5/2010 | Dodgson | ................. G06F 21/62 |
| | | | | 713/153 |
| 2013/0145473 | A1* | 6/2013 | Cormode | ................. G06F 21/10 |
| | | | | 726/26 |
| 2014/0150114 | A1* | 5/2014 | Sinha | ...................... G06F 21/62 |
| | | | | 726/28 |
| 2015/0310219 | A1* | 10/2015 | Haager | ................. H04L 9/0869 |
| | | | | 713/165 |
| 2021/0157797 | A1* | 5/2021 | Dutchak | ............ G06Q 20/3678 |
| 2021/0319131 | A1* | 10/2021 | Salomon | ........... G06F 16/24528 |

OTHER PUBLICATIONS

"Differential Privacy for Directional Data" by Weggenmann et al., CCS '21, pp. 1205-1222. (Year: 2021).*

"The Log-Sum Trick", [Online]Retrieved from the internet: <https://gregorygundersen.com/blog/2020/02/09/log-sum-exp/>, (Feb. 9, 2020), 4 pgs.

(Continued)

*Primary Examiner* — William S Powers
(74) *Attorney, Agent, or Firm* — SCHWEGMAN LUNDBERG & WOESSNER, P.A.

(57) ABSTRACT

Various examples are directed to systems and methods for obscuring directional data to improve privacy. An example system may access a first unit of directional data. The example system may select a sampled value from an angular cumulative distribution function (CDF) of a random distribution. The example system may use the selected sampled value to generate a random sample from the random distribution and apply the random sample to the first unit of directional data to generate a first obscured unit of directional data.

20 Claims, 14 Drawing Sheets

(56) References Cited

OTHER PUBLICATIONS

Chazikokolakis, K, et al., "Broadening the Scope of Differential Privacy Using Metrics," International Symposium on Privacy Enhancing Techologies Symposium, (2013), 32 pgs.

Cutting, Christine, et al., "Tests of concentration for low-dimensional and high-dimensional direcinnl data", Big and Complex Data Analysis, Springer, Cham 209-227, (2017), 17 pgs.

Dwork, Cyntha, "Differential Privacy", ICALP. Lecture Note in Computer Science, vol. 4052, (2006), 1-12.

Dwork, Cynthia, et al., "The Algorithmic Foundations of Differential Privacy"Foundtions and Trends in Theoretical Computer Science, vol. 9, Nos. 3-4 pp. 211-407, (2014), 281 pgs.

Krumm, John, "A Survey of Computional Location Privacy", Personal and Ubiquitous Computing, (2008), 9 pgs.

Kurz, Gerhard, et al., "Stochastic Sampling of the Hyperspherical on Mises-Fisher Distribution Without Rejection Methods", Conference: Proceedings of the IEEE ISIF Workshop on Sensor Data Fusion: Trends, Solutions, Applications, (2015), 6 pgs.

Purkayastha, Sumitra, "A rotationally symmetric directional distribution: obtained through maximum likelihood characterization", Sankh: The Indian Journal of Statistics, Series A pp. 70-83, (1991), 16 pgs.

Pyrgels, Apostolos, "Knock Knock, Who's There? Membership Inference on Aggregate Location Data", arXiv:1708.06145v2 . 25th Annual Network and Distributed System Sucurity Symposium, NDSS, (2017), 15 pgs.

Thompson, Stuart A, et al., "Twelve Million Phones, One Daaset, Zero Privacy", [Online]Retrieved from the internet: <https//www.nytimes.com/interactive/2019/12/19/opinion/location-tracking-cell-phone.html>, (Dec. 19, 2019), 35 pgs.

\* cited by examiner

LOCATION TABLE — 910

| USER ID | DATE | LATITUDE | LONGITUDE |
|---|---|---|---|
| 1 | 1/1/2021 1:23 | 51.1789 N | 1.8262 W |
| 1 | 1/2/2021 2:34 | 27.1127 S | 109.3497 W |
| 2 | 1/1/2021 1:01 | 25.0000 | 71.0000 |

SLEEP SCHEDULE TABLE — 940

| USER ID | SLEEP TIME | WAKE TIME |
|---|---|---|
| 1 | 20:30 | 6:30 |
| 2 | 21:00 | 7:15 |
| 3 | 4:00 | 11:00 |

PRIVACY TABLE — 970

| DATA TYPE | EPSILON |
|---|---|
| LOCATION | 0.5 |
| TIME | 0.2 |
| DAY OF WEEK | 0.1 |

*FIG. 9*

PRIVACY ARRANGEMENT FOR DIRECTIONAL DATA

BACKGROUND

The availability of vast amounts of data has created the potential for significant increases in the capabilities of computers and computing systems. Data sets can be used to enhance software solutions provided by computing systems. For example, data can be used to train machine learning models that can provide enhanced software functionality. Also, the availability of data can allow the development of software applications that are aware of and can consider different kinds of data such as, for example, data describing user locations, purchases, and the like.

BRIEF DESCRIPTION OF THE DRAWINGS

FIG. 9 is a block diagram of an example database schema suitable for storing directional data and privacy measures for use in providing privacy for directional data.

DETAILED DESCRIPTION

Figure 1:
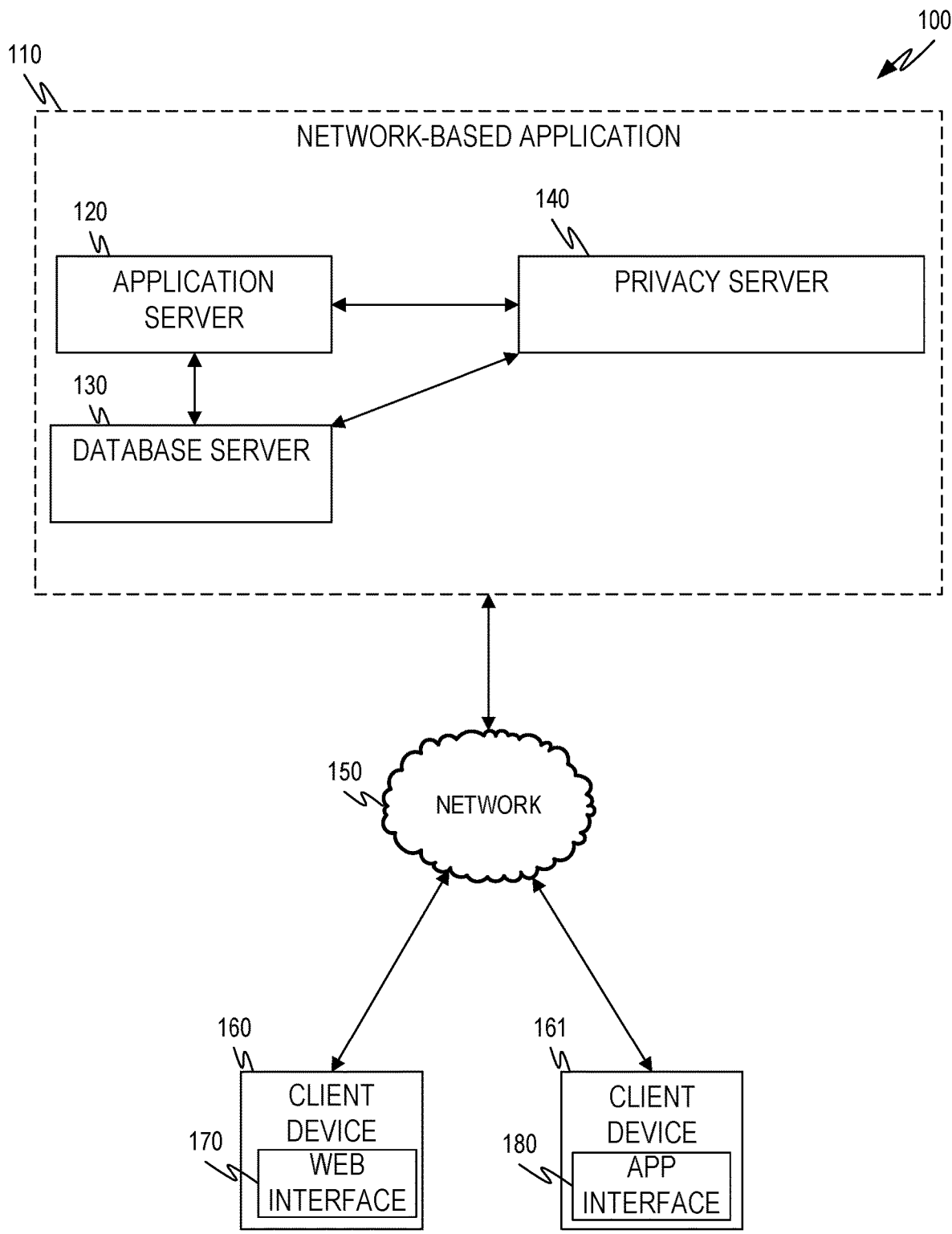
FIG. 1 is a network diagram illustrating an example network environment suitable for providing privacy for directional data.

Directional data is a class of data having values that can be represented on a closed curve, such as a circle or sphere. Consider example directional data describing geographic locations on the earth. Such geographic locations may be represented on an approximate sphere corresponding to the earth. Consider other example directional data describing periodic values such as times of the day or days of the week. Times of day may be represented on a circle similar to a clock face. Days of the week may similarly be represented on a circle. Other examples of directional data are contemplated.

Directional data can be very useful in business and other processing, for example, to enable location and/or time-aware software solutions. Consider various location and time-based analytics products that are available to, for example, provide users with routing, mapping, traffic reports, popular visit times for locations such as stores or restaurants, tracking of user steps and other health-related data, and the like. Many of these solutions utilize directional data gathered from observing various users.

While large-scale data collection and processing has become a valuable technique, data collected in such scenarios is often privacy sensitive. Directional data, in some examples, conveys particularly sensitive information indicating user locations, the timing of user activities, and the like. Further, even when confidential directional data is used at a backend system to train a machine learning model, the privacy of the directional data still may not be protected. For example, although training data is not typically included in the output of a machine learning model, it may still be possible to infer the content of the training data from output of the model using a membership inference attack.

Differential privacy mechanisms can be used to obscure data and thereby protect the privacy of the users who were observed to generate the data. According to differential privacy mechanisms, random noise is added to observed data in order to obscure the observed data and/or the user who was observed to generate the data. In some examples, random noise is added directly to observed data. In other examples, differential privacy is applied during the training of a machine learning model to obscure the training data. Consider an example machine learning model that is trained using a gradient descent technique. Applying differential privacy may include adding random noise to the gradients determined at the end of each training epoch. This may cause the resulting machine learning model to behave slightly differently than it otherwise would so as to obscure or make it more difficult to determine whether any given data item was part of the training data set.

Various differential privacy techniques apply random noise according to a constraint or condition. Consider the differential privacy condition given by Equation [1] below:

$$S \subseteq \text{Range}(M), Pr[M(X_1) \in S] \le \exp(\varepsilon) \times Pr[M(X_2) \in S] + \delta \quad [1]$$

In Equation [1], M is a randomized function. M is ($\varepsilon$, $\delta$)-differentially private if it meets the differential privacy condition given by Equation [1]. In Equation [1], $X_1$ and $X_2$ are sets of observed data differing on, at most, one data item. $M(X_1)$ and $M(X_2)$ are the output of random noise applied to the observed data sets $X_1$ and $X_2$. S is a value in the set of all possible outputs of M. The value $\delta$ is the probability of failure (for example, the probability that the difference between $X_1$ and $X_2$ is detectable).

The value $\varepsilon$ is the privacy parameter and may also be referred to as a privacy budget. For example, the privacy budget $\varepsilon$ may describe the maximum permissible difference between a query on the observed data and a query on the observed data adding or removing one entry. The privacy budget can also describe the amount of random noise that is added to data set $X_1$, such that it cannot be discerned from the observed data set adding or removing one entry $X_2$. A lower privacy budget (e.g., a smaller permissible difference between the observed data set $X_1$ and the observed data set adding or removing one entry $X_2$) implies a higher level of random noise added to the observed data set $X_1$.

As the privacy budget ε decreases, the output of the differential privacy mechanism becomes more private. For example, as the privacy budget ε is reduced, the difference between the observed data $X_1$ and the obscured data after the application of random noise $M(X_1)$ increases. This makes the obscured data more private, but also decreases the usefulness of the resulting data to a computing system. For example, as differences between the observed data $X_1$ and the obscured data $M(X_1)$ increase, the accuracy and/or usefulness of a resulting software application may also decrease.

The use of directional data may further complicate differential privacy mechanisms. For example, differential privacy mechanisms may use random distributions to generate random noise to be applied to observed data. Commonly used random distributions, such as various Laplace distributions, however, are not directional. For example, the standard Laplace mechanism may be defined on a real line rather than a circle, and the Planar Laplace mechanism may be defined for planar locations, not spheres. Accordingly, using a Laplace or other non-directional distribution to apply differential privacy to directional data may involve modifying the directional data to treat it as non-directional. Consider example time of day data. To apply differential privacy using a non-directional random distribution, the data may be modified to treat 12:00 AM and 11:59 PM, for example, as being at opposite ends of a linear 24-hour range instead of nearly adjacent points in a periodic domain. The post-processing used to apply differential privacy to directional data, then, may increase the amount of noise applied the observed data for a given privacy budget, thus reducing the usefulness of the data.

Various examples described herein include systems and methods that apply differential privacy mechanisms that are adapted to directional data. Using differential privacy mechanisms adapted to directional data rather than treating directional data as non-directional data may protect privacy to the same degree while introducing less noise to the observed data, thereby increasing the accuracy of computing systems that use observed directional data without compromising user privacy.

Accordingly, one or more of the methodologies described herein may improve computing systems by allowing for more accurate measurement of aggregate metrics, such as aggregate user behavior without increasing the impingement on user privacy. Alternatively, the same degree of accuracy may be achieved with fewer records received from users. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating an example network environment 100 suitable for providing privacy for directional data. The network environment 100 includes a network-based application 110, client computing devices 160 and 161, and a network 150. The network-based application 110 is provided by application server 120 in communication with a database server 130 and a privacy server 140. The application server 120 accesses application data (e.g., application data stored by the database server 130) to provide one or more applications to the client computing devices 160 and 161 via a web interface 170 or an application interface 180.

The application server 120, the database server 130, the privacy server 140, and the client computing devices 160 and 161 may each be implemented in a computer system, in whole or in part, as described below with respect to FIGS. 13-14. The client computing devices 160, 161 provide directional data to the application server 120 for storage in a database of the database server 130. For example, location data (e.g., derived from the global positioning service (GPS) of a cell phone) may be uploaded to the application server 120 via the network 150 and stored by the database server 130. The location data may be aggregated to provide an indication of an aggregate metric, such as aggregate traffic flow, population density measurements, peak time measurements for businesses, or any suitable combination thereof.

The privacy server 140 accesses directional data from the database server 130 and applies differential privacy, for example, according to the examples described herein. The functionality of the privacy server 140 may be integrated into the database server 130. Alternatively, the client computing devices 160, 161 may implement differential privacy for a user's directional data, for example, according to the examples described herein. For example, a client computing device 160, 161 may obscure the user's direction data by modifying the data before it is uploaded to the application server 120.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 13-14. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the database server 130, the privacy server 140, and the client computing devices 160, 161 are connected by the network 150. The network 150 may be any network that enables communication between or among machines, databases, and devices. Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof.

Figure 2:
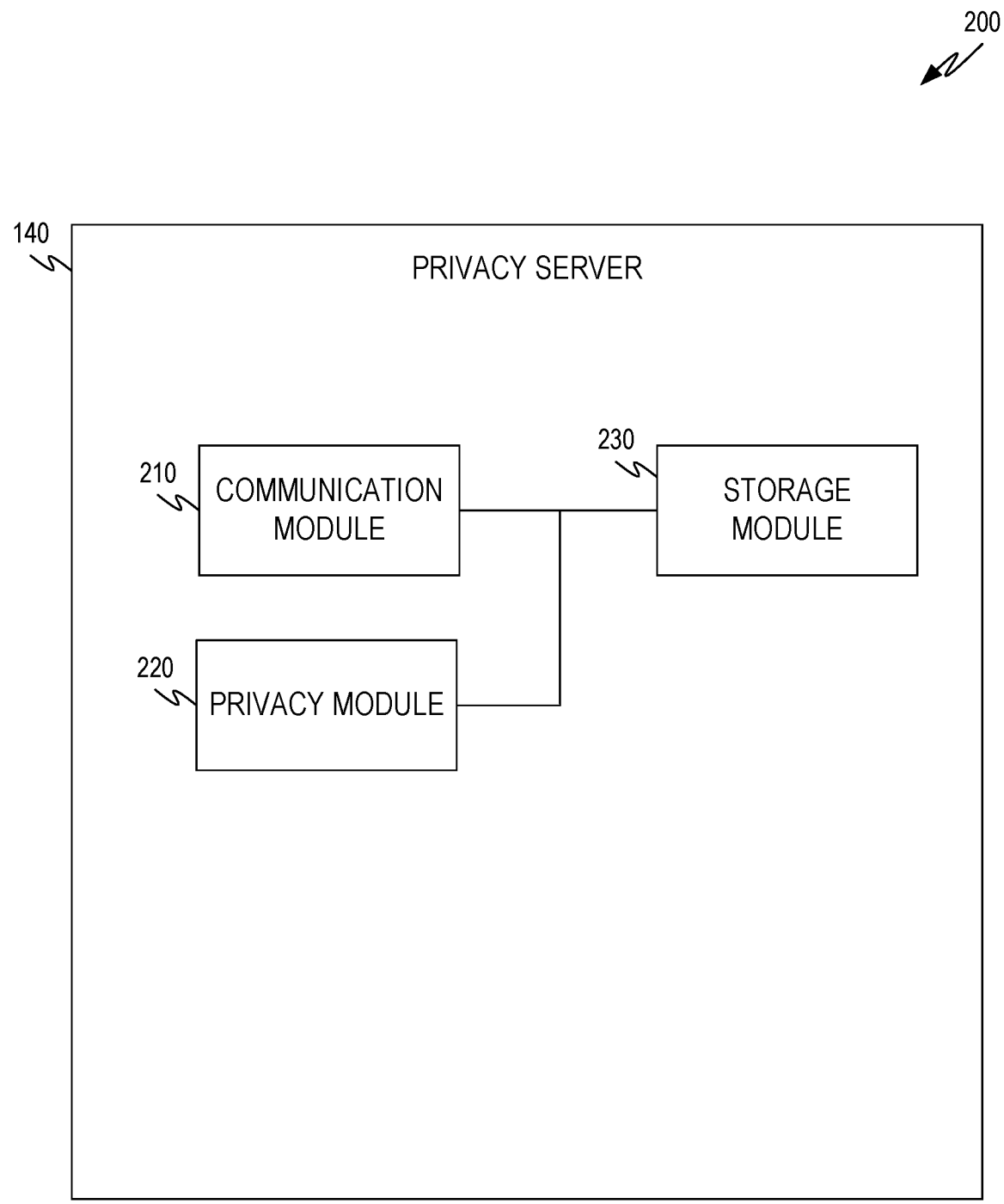
FIG. 2 is a block diagram of an example privacy server suitable for providing privacy for directional data.

FIG. 2 is a block diagram 200 of the privacy server 140, suitable for protecting privacy of directional data. The privacy server 140 is shown as including a communication module 210, a privacy module 220, and a storage module 230, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the privacy server 140 and transmits data from the privacy server 140. For example, the communication module 210 may receive, from the client computing device 160 or 161, directional data to be stored by the database server 130. The privacy server 140 may modify the received directional data before sending the modified data, via the communication module 210, to the database server 130, protecting the privacy of the user of the client computing device 160 or 161. As another example, the communication module 210 may receive a request for aggregated directional data, request the directional data from the database server 130 and provide the directional data to the privacy module 220 for processing in a manner that protects the privacy of the users that contributed the directional data. Communications sent and received by the communication module 210 may be intermediated by the network 150.

The privacy module 220 accesses directional data from the database server 130 and, based on the accessed directional data, generates differentially private directional data as described herein. For example, the differentially private directional data may be generated based on a predetermined privacy factor and a probability distribution on an n-sphere before being provided in response to a request for the aggregated results. Thus, the differentially private directional data generated by the privacy module 220 may be similar to the input directional data, but different. A user of the differentially private directional data may not be sure of the exact differences, thus protecting the privacy of the users that contributed the underlying directional data.

The storage module 230 stores the predetermined privacy factor and other data used by the privacy module 220 to modify directional data to protect privacy. The storage module 230 may store programming instructions for the communication module 210, the privacy module 220, or both.

The privacy module 220 is described as being part of the privacy server 140, operating on data accessed from the database server 130. Alternatively, the privacy module 220 may be part of the client computing devices 160, 161 operating on data generated by the client computing device before providing the privacy-protected directional data to the database server 130.

Various examples described herein apply differential privacy mechanisms using representations of directional data expressed on a close curve referred to as an (n-1) sphere. An (n-1) sphere is a set of points in an n-dimensional Euclidian space that are located at a constant distance r from a central point. For example, directional data may be represented as points on the (n-1) sphere or as vectors from the origin of an (n-1) sphere to a point on the surface of the (n-1) sphere. For example, r may be the radius of the (n-1) sphere and the central point may be a center of the (n-1) sphere. The (n-1) sphere with a radius of 1 may be referred to as the unit (n-1) sphere or just the (n-1) sphere. Accordingly, an ordinary 3-dimensional unit sphere may be referred to as "the 2-sphere." Similarly, a 2-dimensional circle may be referred to as "a 1-sphere." Mathematically, for $n \in N$, the unit (n-1) sphere is given by Equation [2] below:

$$S^{n-1} := \{X \in R^n : \|x\| = 1\} \qquad [2]$$

In Equation [2], $\{x \in R^n : \|x\| = 1\}$ is the set of unit vectors in n-dimensional Euclidean space. The (n-1) sphere of radius $r > 0$ is denoted as $rS^{n-1}$.

Figure 3:
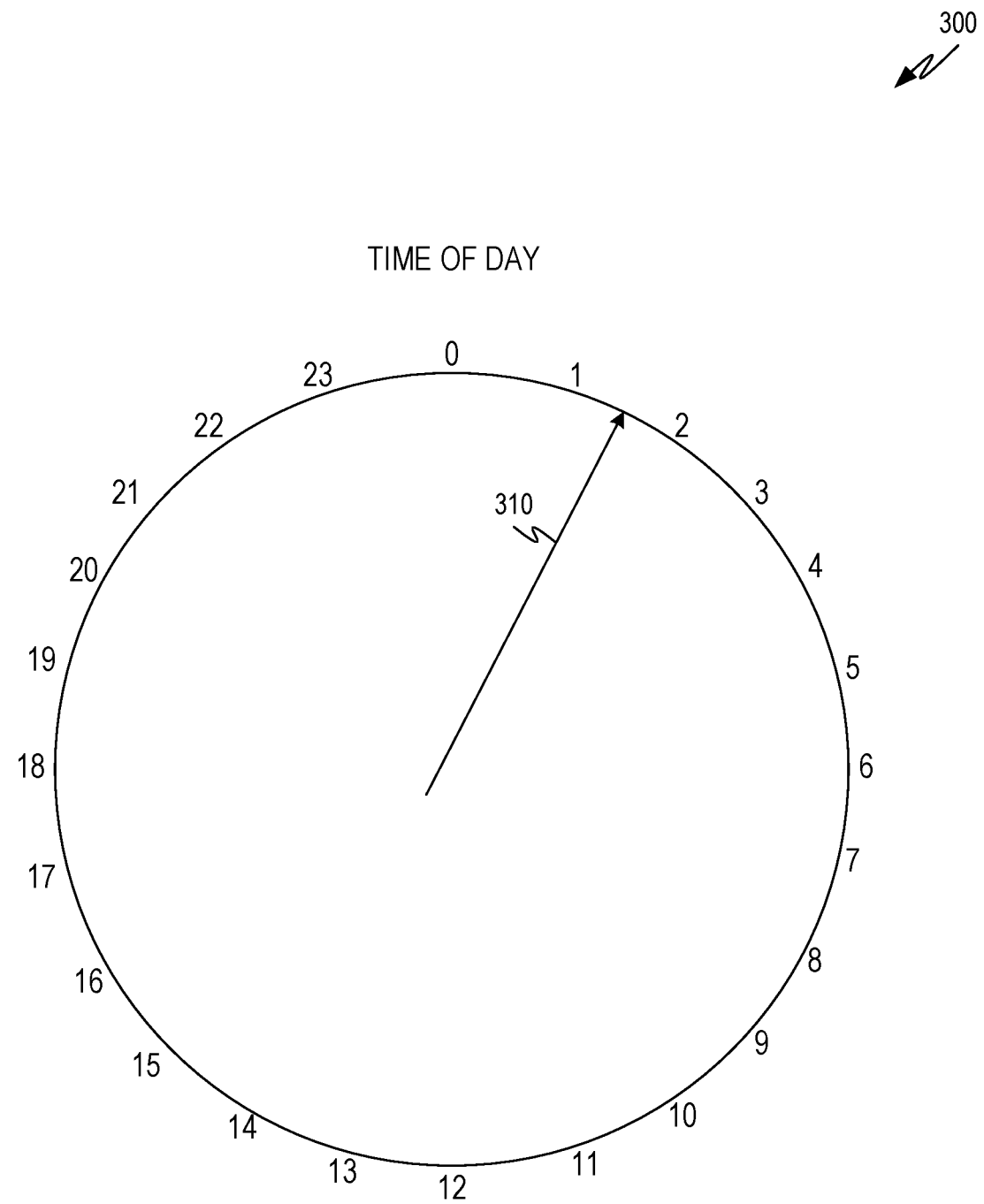
FIG. 3 is a conceptual diagram showing a time of the day as directional data on a 1-sphere.
Figure 4:
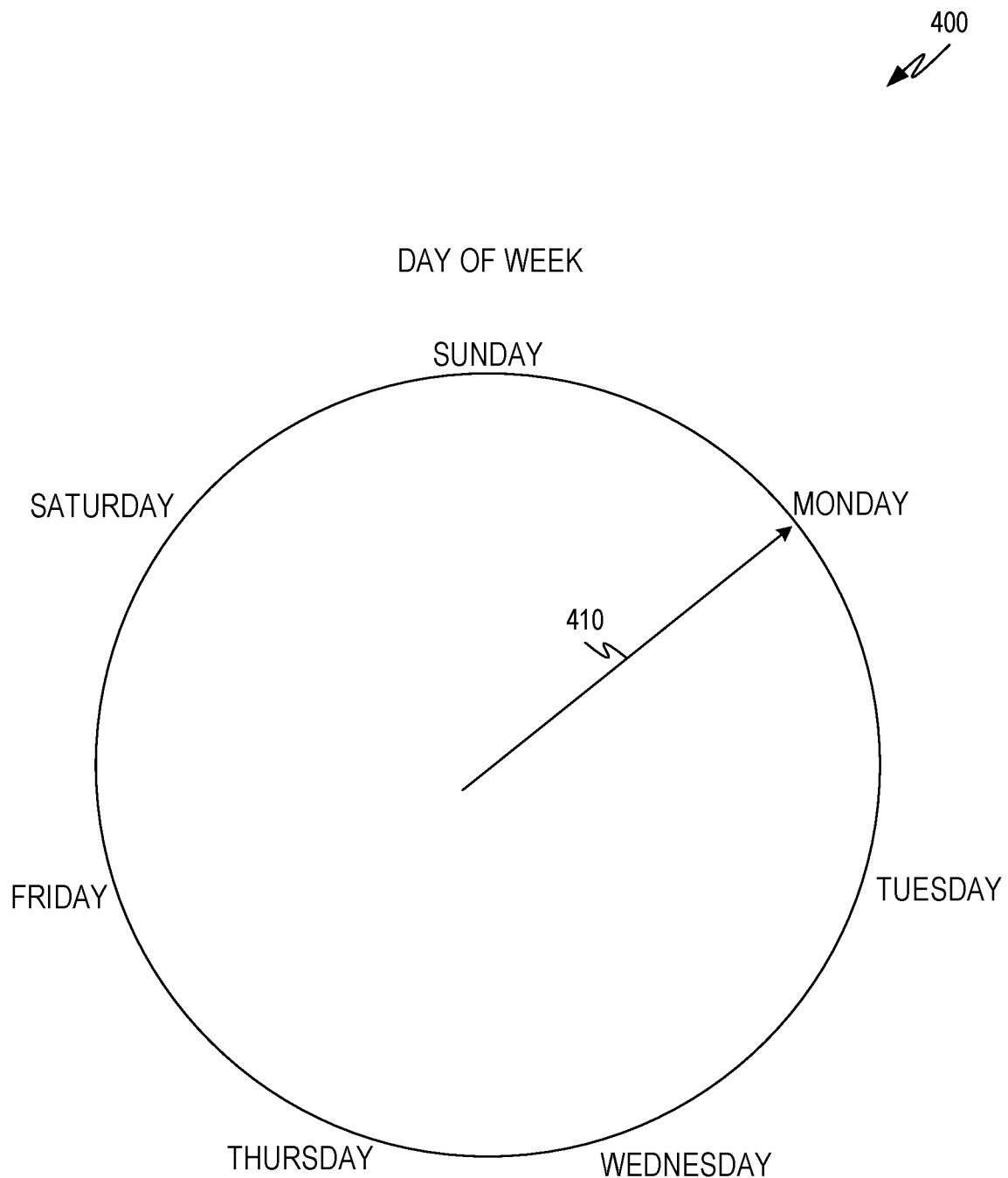
FIG. 4 is a conceptual diagram showing a day of the week as directional data on a 1-sphere.
Figure 5:
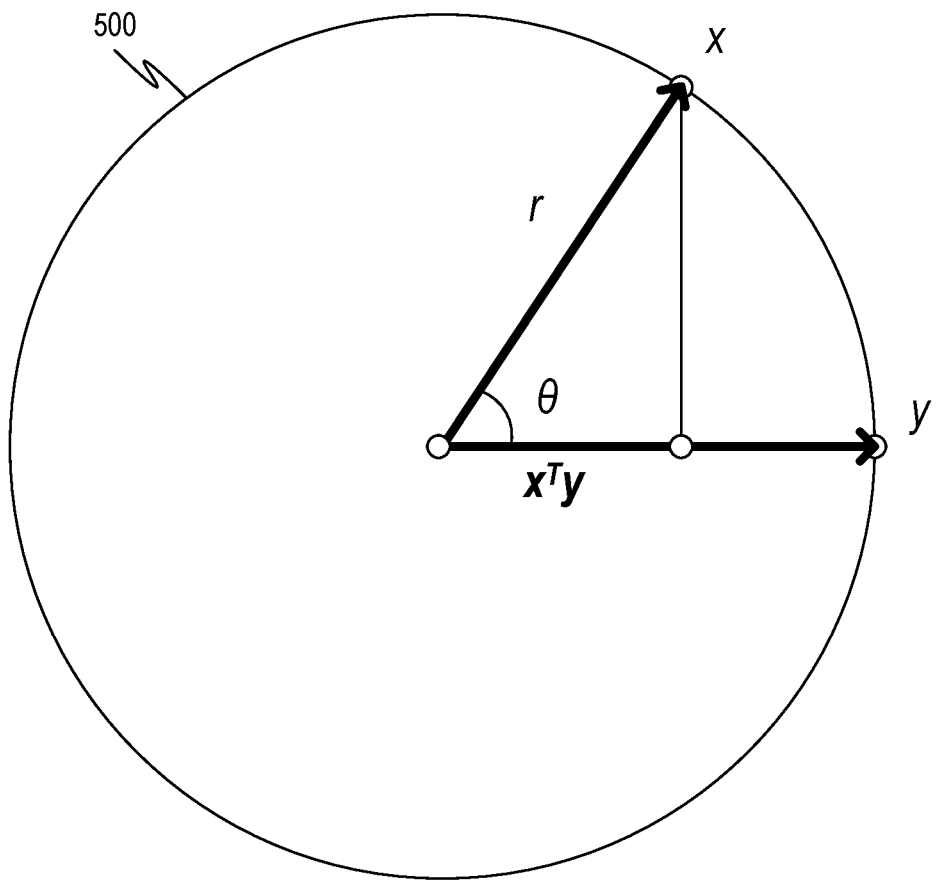
FIG. 5 is a diagram showing an example (n-1) sphere arranged to demonstrate an example way of applying differential privacy to directional data using surface distances.

FIGS. 3-5 illustrate example directional data representations. FIG. 3 is a conceptual diagram showing a time of the day as directional data on a 1-sphere (a circle) 300. The time of day is shown as a 24-hour clock, continuously connecting all times of the day. The vector 310 shows the time 1:30. To simplify calculations, the circle 300 may be a unit circle (a circle with a radius of one) and the vector 310 may be a unit vector (a vector with a length of one). The arc distance between two vectors may be measured as the smaller angle between them, regardless of where on the circle 300 the two vectors are located. Thus, the arc distance between 23:00 and 1:00 is $\pi/6$ radians (30 degrees) even though the 0:00 value lies between them. Since the circle is a unit circle, the distance on the surface of the circle 300 between the ends of the vectors is equal to the arc distance in radians. If the directional data were treated as linear data with a range of 0 to 23:59, the distance between 1:00 and 23:00 would be measured as 22 hours apart.

FIG. 4 is a conceptual diagram showing a day of the week as directional data on a 1-sphere (a circle) 400. The days of the week are shown in a continuous loop, without a discontinuity between days at the beginning and end of the week. The vector 410 shows the day Monday. To simplify calculations, the circle 400 may be a unit circle and the vector 410 may be a unit vector. As in FIG. 3, the arc distance between two vectors may be measured as the smaller angle between them, regardless of where on the circle 400 the two vectors are located. Thus, the arc distance between Saturday and Monday is $2\pi/7$ radians even though the beginning of the week lies between them. If the directional data were treated as linear data with a range of Sunday to Saturday, the distance between Monday and Saturday would be measured as five days apart.

FIG. 5 is a diagram showing an example (n-1) sphere 500 arranged to demonstrate an example way of applying differential privacy to directional data using surface distances. In the example of FIG. 5, the (n-1) sphere 500 is a two-dimensional circle, which may be referred to as a 1-sphere, similar to the example 1-spheres described in FIGS. 3 and 4. It will be appreciated, however, that the concepts described may be applied in higher dimensions as well. The (n-1) sphere 500 shown in FIG. 5 includes directional data x and y represented as points on the surface of the n-sphere 500 and/or as vectors from the origin of the (n-1) sphere 500. In the example of FIG. 5, the surface distance between points x and y is the distance of the arc on the surface of the (n-1) sphere 500 between x and y. This distance may be represented by Equation [3] below:

$$d_{\mathcal{A}}(x, y) = r \text{ arc } \cos(x^T y) \qquad [3]$$

In Equation [3], $d_{\mathcal{A}}$ is the surface distance between points x and y and $x^T y$ is the projection of the vector x on vector y, where the vector x extends from the origin of the (n-1) sphere 500 to the point x and the vector y extends from the origin of the (n-1) sphere 500 to the point y. The value r is the radius of the (n-1) sphere 500. Because the (n-1) sphere 500 is a unit sphere, however, the radius r is equal to 1 and may be dropped from the Equation [3].

Using surface distance $d_{\mathcal{A}}$ as indicated by Equation [3], a randomized function M may be directionally private (also referred to as $\epsilon d_{\mathcal{A}}$ differentially private) if the function M fulfills the differential privacy condition given by Expression [4] given the further conditions indicated by Expressions [5] and [6]:

$$Pr[M(x) \in S] \leq Pr[M(y) \in S] \times \exp(\varepsilon d_{\measuredangle}(x, y)) \quad [4]$$

$$x, y \in \mathbb{S}^{n-1} \quad [5]$$

$$S \subset \text{supp } M \quad [6]$$

Expression [5] indicates that points x and y are on the (n-1) sphere 500. Expression [4] indicates that the probabilities of producing the same outcome S can deviate by, at most, a factor that grows exponentially with the surface distance between points x and y.

One example random distribution that can be used to meet the conditions of Expressions [4]-[6] is the von Mises-Fisher (VMF) mechanism, given by Equation [7] below:

$$VMF(\mu, K)[x] = CVMF(n, \varepsilon) \cdot \exp(K \cdot \mu x) \quad [7]$$

The Equation [7] describes a distribution of random vectors x that are concentrated around a mean direction $\mu$. The parameter K characterizes how strongly the random vectors x~VMF($\mu$, K) are concentrated about the mean direction $\mu$. If K>0, the distribution is unimodal and the mode matches $\mu$. A VMF distribution with zero concentration (K=0) degenerates to the uniform distribution Uni($\mathbb{S}^{n-1}$).

As shown in Equation [7], the probability density function (PDF) of the VMF mechanism changes exponentially with the projection $t = \mu^T x$ of the random vector x onto the mean direction $\mu$. In various examples, improved results may be obtained by selecting a mechanism that changes exponentially with the surface distance between a random vector x and the mean direction $\mu$. Such a mechanism would meet the condition stated by Expression [8] below:

$$\text{Density} \propto \exp(-\varepsilon \cdot \arccos(\mu^T x)) \quad [8]$$

A mechanism meeting the condition of Expression [8] may decay exponentially with increasing surface distance from the mean direction $\mu$.

An example distribution that meets the condition of Expression [8] is the Purkayastha distribution. Equation [9] below provides an example expression of a Purkayastha distribution on an (n-1) sphere with a mean direction $\mu$ extending from the origin of the (n-1) sphere to a point on the surface and a concentration parameter K that is greater than or equal to zero:

$$Pur(\mu, K)[x] = C_{n,K} \cdot \exp(-K \cdot \arccos(\mu^T x)) \quad [9]$$

In Equation [9], $C_{n,K}$ is a normalization factor that may be given by Equation [10]:

$$C_{n,\kappa} = S_{n-2}^{-1} F_{n-2,-\kappa}^{-1}(\pi) \quad [10]$$

Further:

$$F_{n-2,-\kappa}^{-1}(\pi) = \begin{cases} \dfrac{\kappa(\kappa^2 + 2^2)(\kappa^2 + 4^2) \ldots (\kappa^2 + (n-2)^2)}{(n-2)!(1 - \exp(-\kappa\pi))}, & \text{for even } n \\ \dfrac{\kappa(\kappa^2 + 1^2)(\kappa^2 + 3^2) \ldots (\kappa^2 + (n-2)^2)}{(n-2)!(1 - \exp(-\kappa\pi))}, & \text{for odd } n \end{cases} \quad [11]$$

An example differential privacy mechanism based on the Purkayastha distribution, referred to as the Purkayastha privacy mechanism, may be described as follows. A Purkayastha privacy mechanism on an (n-1) sphere may be induced by:

$$x \mapsto Pur(x, \varepsilon) \text{ for } x \in \mathbb{S}^{n-1} \quad [12]$$

In Expression [12], $\varepsilon$ may be a privacy budget value and may be greater than zero. The Purkayastha privacy mechanism may also fulfill the differential privacy conditions given by Expressions [4], [5], and [6]. The example Purkayastha privacy mechanism may also be expressed as provided by Expression [13]:

$$Pur\left(x, \frac{\varepsilon}{\Delta}\right) \quad [13]$$

In this expression, the Purkayastha privacy mechanism may provide $\varepsilon$-differential privacy for sphere-valued functions given by Expression below:

$$f: \mathcal{D} \to \mathbb{S}^{n-1} \quad [14]$$

In Expression [13], $\Delta$ is the $d_{\measuredangle}$ sensitivity of the mechanism on the space of datasets $\mathcal{D}$.

Figure 6:
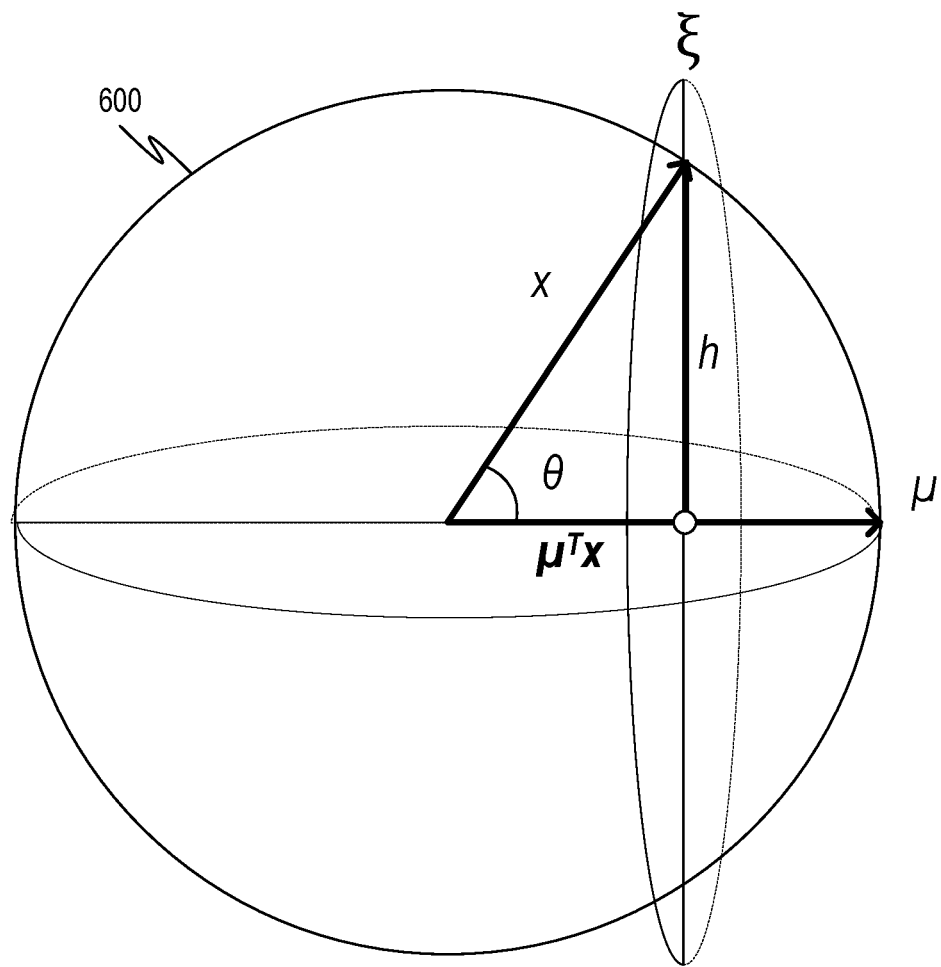
FIG. 6 is a diagram showing another example (n-1) sphere arranged to illustrate features of an example sampling technique for use with a Purkayastha privacy mechanism, including the tangent normal decomposition.

To utilize the example Purkayastha privacy mechanism set forth herein, a sampling technique may be used to select random values from the mechanism to be added to observed data. In some examples, a sampling technique for Purkayastha distributions may utilize the tangent normal decomposition. FIG. 6 is a diagram showing another example (n-1) sphere 600 arranged to illustrate features of an example sampling technique for use with a Purkayastha privacy mechanism, including the tangent normal decomposition. The (n-1) sphere 600 is shown in three dimensions, meaning that the (n-1) sphere 600 may also be referred to as a 2-sphere.

The surface area of the (n-1) sphere 600 is given by an (n-1) dimensional volume expressed by Equation [15] below:

$$S_{n-1} = vol(\mathbb{S}^{n-1}) = \frac{2 \cdot \pi^{\frac{n}{2}}}{\Gamma\left(\frac{n}{2}\right)} \quad [15]$$

The example (n-1) sphere 600 also indicates a mean direction $\mu$ of a Purkayastha distribution. An example random vector x is also shown. In some examples, because the Purkayastha distribution is rotationally symmetric, the expression of the random vector x may be further simplified to n-2 dimensions. For example, a random vector x of the Purkayastha distribution may be expressed as a tangent decomposition, also illustrated in FIG. 6. The tangent decomposition t of the example random vector x, which may be the projection of the random vector x onto the mean direction $\mu$, is also given by Equation [16] below:

$$t = \mu^T x \quad [16]$$

Also, because of the rotational symmetry of the Purkayastha distribution, the random vector x, in some examples, can be expressed in terms of the angle $\theta$ between the random vector x and the mean direction $\mu$. The angle $\theta$ may be expressed as given by Equation [17] below:

$$\theta = \arccos(\mu^T x) \quad [17]$$

The random vector x may also be expressed using a random tangent vector $\xi$ (shown in FIG. 6) drawn uniformly from a sub-sphere $\mathbb{S}^{n-2} \perp \mu$.

Accordingly, the random vector x may be rewritten as indicated by Equations [18] and/or [19] below:

$$x = t\mu + \sqrt{1 - t^2}\xi \quad [18]$$

$$x = \cos(\theta)\mu + \sin(\theta)\xi \quad [19]$$

In some examples, an example mechanism for sampling a Purkayastha distribution may be determined by integrating the angular density of the Purkayastha distribution, finding an angular cumulative distribution function (CDF) and finding an approximate inversion Purkayastha sampling algorithm.

The angular density of a Purkayastha distribution may be given by Equation [20] below:

$$\text{Pur Arc}(n, K)[\theta] = C'_{n,k} \cdot \sin^{n-2}(\theta) \cdot e^{-K\theta} \quad [20]$$

Accordingly, the angular density of the Purkayastha distribution may be specified through a term of the general form given by Expression [21]:

$$e^{ax} \sin^n(x) \quad [21]$$

An antiderivative of the form given by Expression [21] with $n \in \mathbb{N}$ and $a \in \mathbb{R}$ is given by expression [22]:

$$E_{n,a}(x) = \sum_{k=0}^{m} C_k \mathcal{T}_k(x) \quad [22]$$

Where:

$$m = \lfloor n/2 \rfloor \quad [23]$$

$$C_k = \frac{n!}{(n-2k)!} \prod_{\ell=0}^{k} \frac{1}{(a^2 + (n-2\ell)^2)} \quad [24]$$

and $$\mathcal{T}_k(x) = a \cdot \sin^{n-2k}(x) - (n-2k) \cdot \cos(x) \sin^{n-2k-1}(x) \quad [25]$$

With the term $\mathcal{T}_k(x)$, it may be stipulated that $\sin^0(x)=1$ and that $\cos(x)\sin^{n-2k-1}(x)=0$. A definite integral of Expression [21] over the range $[0,\vartheta]$ may be given by Equation [26] below:

$$F_{n,a}(\vartheta) = \int_0^\vartheta e^{ax} \sin^n(x) dx = E_{n,a}(\vartheta) - E_{n,a}(0) \quad [26]$$

A special case of Equation [26] may occur for $F_{n-2,-\kappa}(\pi)$, which may be used in the normalization factor given by Equation [27] below:

$$C'_{n,\kappa} = F_{n-2,-\kappa}^{-1}(\pi) \quad [27]$$

Based on Equations [26] and [27], the Equation [28] given below may indicate the angular CDF of the angular Purkayastha distribution:

$$Pur\text{Arc}(n, \kappa)[\theta \le \vartheta] = C'_{n,\kappa} \int_0^\vartheta \sin^{n-2}(\theta) \cdot \exp(-\kappa\theta) d\theta = \frac{F_{n-1,-\kappa}(\vartheta)}{F_{n-1,-\kappa}(\pi)} \quad [28]$$

The form indicated by Equation may be a closed form solution that may be evaluated in terms of finite sums $E_{n,a}(x)$ and Equation [27] for both odd and even n. In some examples, increased numerical precision may be achieved by utilizing logarithmic techniques. This may convert exponentiations to multiplications, which may simplify operations such as, for example, those described herein that include raising the sine function to various powers.

One example way of generating samples from the angular CDF of a random distribution is to use an inversion method. With regard to the CDF of the angular Purkayastha distribution, however, it may be difficult to analytically determine the inverse, for example, for n>2. In various examples, then, the approximate inversion of the CDF given by Equation [28] may be found to derive a Purkayastha sampling algorithm. For example, based on Equation [28], the angular CDF of a Purkayastha distribution can be expressed as:

$$u = \text{Pur Arc}(n, K)[\theta \le \vartheta] \quad [29]$$

The inverse of the angular CDF given by Equation [30]:

$$\vartheta = \text{Pur Arc}(n, K)^{-1}[u] \quad [30]$$

The inverse of the angular CDF may be determined, for example, using an approximate inversion method, resulting in a sampled value from the angular CDF. An example process flow for sampling a value from a random distribution, such as a Purkayastha distribution, using an approximate inversion method is described in more detail herein with respect to FIG. 8. When a sampled value is determined, a tangent normal decomposition of the sampled value from the angular CDF may be determined to generate a random sample x, which may be described by Equation [31] below:

$$x = \cos(\vartheta)\mu + \sin(\mu)\xi \quad [31]$$

In equation [31], $\mu$ is a unit of directional data (e.g., a unit of direction data to be obscured. Also, $\xi$ is a uniformly random unit vector that is perpendicular to $\mu$. The random sample x, then, may be an obscured version of the unit of directional data $\mu$.

Figure 7:
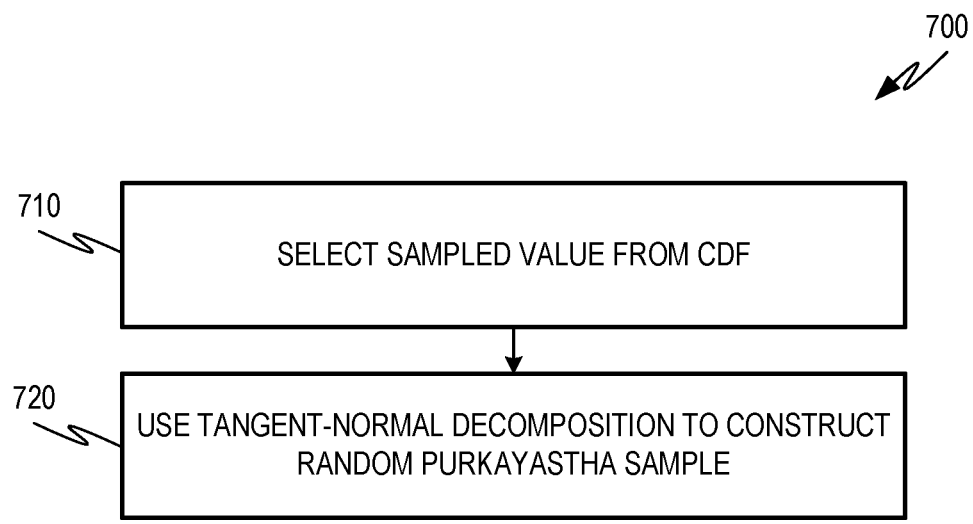
FIG. 7 is a flowchart showing one example of a process flow that may be executed to generate differential private directional data.

FIG. 7 is a flowchart showing one example of a process flow 700 that may be executed, for example by a privacy module 220, to generate differential private directional data. At operation 710, the privacy module 220 may select a sampled value from the angular CDF of a random distribution, such as a Purkayastha distribution. This may include, for example, applying an approximate inversion method to the angular CDF of the distribution, for example, as described in more detail herein with respect to FIG. 8. At operation 720, the privacy module 220 may apply a tangent-normal decomposition to the sampled value, for example, as described herein including at Equation [31]. This may result in a random sample that, as described herein, may be an obscured unit of direction data that may be differentially private relative to the input direction data unit.

Figure 8:
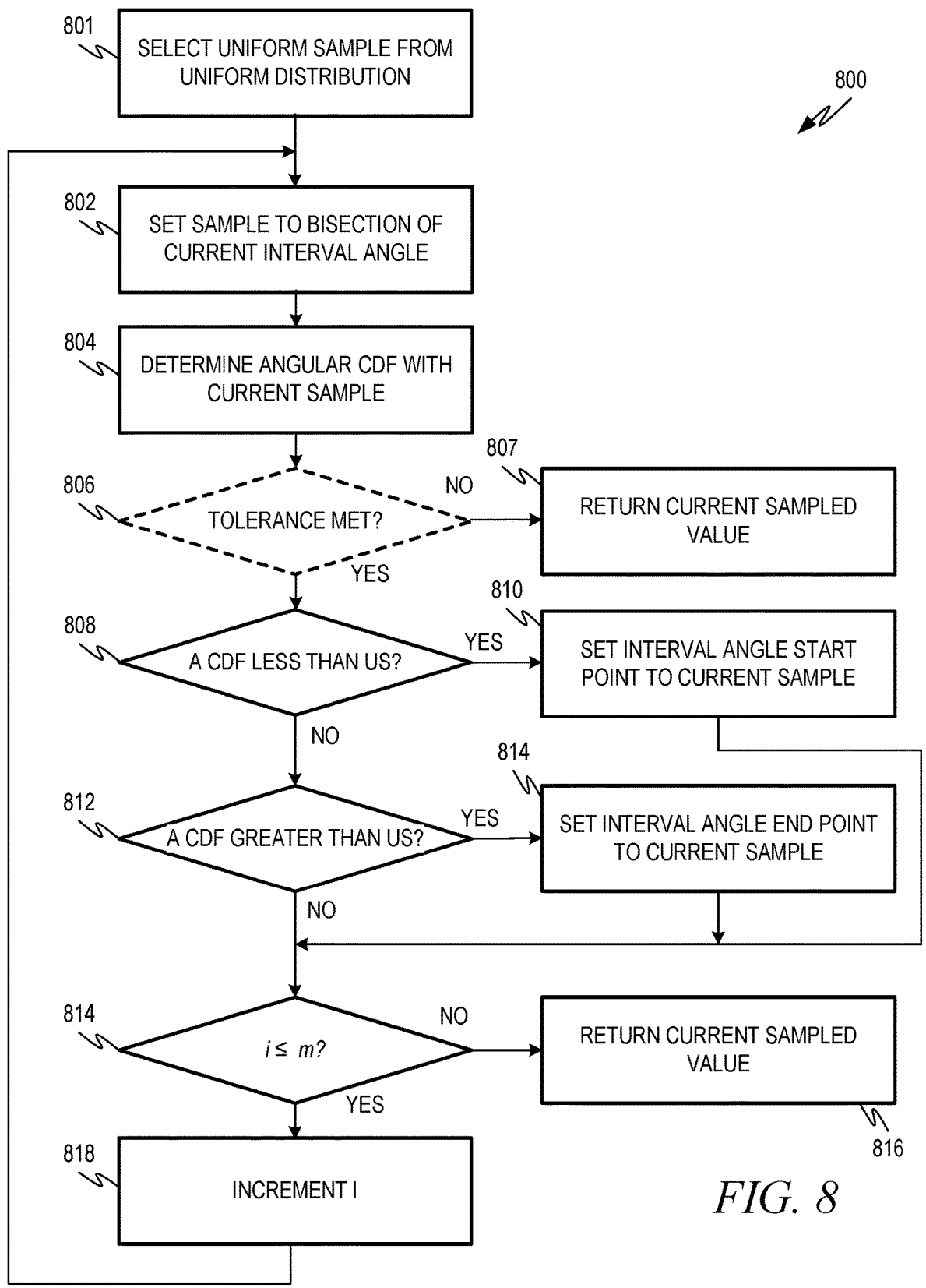
FIG. 8 is a flowchart showing one example of a process flow that may be executed to select a sample from a random distribution, such as a Purkayastha distribution.

FIG. 8 is a flowchart showing one example of a process flow 800 that may be executed, for example, by a privacy module 220, to select a sample from a random distribution, such as a Purkayastha distribution. For example, the process flow 800 describes one example way that approximate inversion may be applied to the angular CDF function of a Purkayastha or other random distribution to generate random samples thereof. For example, the process flow 800 may be applied to the angular CDF function of a Purkayastha, such as the example described by Equation [28] above. The process flow 800 may operate over an interval of the angular CDF function, which may be expressed as an angle referred to as an interval angle. An initial interval angle may be selected, such as, for example, an interval angle between zero and $\pi$ radians. In various examples, the process flow 800 is performed over a number of iterations, given by m.

At operation 801, the privacy module 220 selects a uniform sample from the uniform distribution Uni(0,1). At operation 802, the privacy module 220 may set a current sampled value $\vartheta$ to a bisection of the current interval angle. The bisection may be, for example, a midpoint of the current interval angle. This may be performed, for example, according to Equation [32] below:

$$\vartheta = (a+b)/2 \quad [32]$$

In Equation [32], the values a and b are the bounds of the current interval angle. For example, if the initial interval angle is between 0 and $\pi$ radians, then a may initially be equal to 0 and b may initially be equal to $\pi$ radians.

At operation 804, the privacy module 220 may evaluate the angular CDF of the random distribution using the current sampled value to generate an angular CDF value. In an example using the Purkayastha distribution, this may include using the current sampled value $\vartheta$ in conjunction with the expression of the angular CDF described by Equation [28] herein. Optionally, at operation 806, the privacy module 220 evaluates a tolerance condition. For example, the tolerance condition may be met if a difference between the angular CDF value and the uniform sample selected at operation 801 is less than a tolerance value. If the tolerance condition is met, the process flow 800 may return the current sampled value at operation 807. For example, the current sampled value may be returned as the sampled value.

If the tolerance condition is not met and/or if operation 806 is omitted, the privacy module 220 may determine, at operation 808, if the angular CDF value is less than the uniform sample selected at operation 801. If the angular CDF value is less than the uniform sample, then the privacy module 220 may update the current interval angle at operation 810 to set the interval angle start point to the current sample value. Then the privacy module 220 may proceed to operation 814 described in more detail herein. If the angular CDF value is greater than (or not less than) the uniform sample at operation 812, the privacy module 220 may modify the current interval angle at operation 814 to set the current interval angle end point to the current sample.

At operation 814, the privacy module 220 determines if the current iteration, represented by i, is less than or equal to the total number of iterations to be performed m. If the current iteration is less than or equal to the total number of iterations m, this may indicate that the total number of iterations m have not yet been executed. The privacy module 220 may increment i at operation 818 and return to operation 802 using the current interval angle as modified at operation 810 or operation 814. If the current iteration i is not less than or equal to the total number of iterations m, it may indicate that the total number of iterations m have been performed. The privacy module 220 may return the current sampled value at operation 816. For example, the current sampled value returned at operation 816 may be used at operations 720 and 730 of the process flow 700, as described herein.

FIG. 9 is a block diagram of an example database schema 900, suitable for storing directional data and privacy measures for use in providing privacy for directional data. The database schema 900 includes a location table 910, a sleep schedule table 940, and a privacy table 970. The location table 910 includes rows 930, 932, and 934 of a format 920. The sleep schedule table 940 includes rows 960, 962, and 964 of a format 950. The privacy table 970 includes rows 990, 992, and 994 of a format 980.

Each row of the location table 910 stores a location on the globe for a user at a date and time. The user identifier (ID) field stores a unique identifier for the user. For improved privacy protection, the user ID field may be replaced with a unique record ID, changed for each client computing device 160, 161 after a predetermined period of time (e.g., every 15 seconds or every 60 seconds), or removed entirely. The latitude and longitude fields store the location of the user at the date and time indicated in the date field. For client-side privacy protection mechanisms, the location data in each row may have been modified by the client before uploading the data to the database server 130. For server-side privacy protection mechanisms, the location data in each row may be accurate, but the data will be modified by the privacy module 220 before being provided by the privacy server 140 to another server or client.

The rows of the sleep schedule table 940 store sleep times and wake times for users. The user ID field stores a unique identifier for the user. The sleep time and wake time fields store the time at which the identified user goes to sleep and wakes up (e.g., as self-reported, as an average of measurements, or with additional date/day information that allows for multiple rows per user). For client-side privacy protection mechanisms, the time data in each row may have been modified by the client before uploading the data to the database server 130. For server-side privacy protection mechanisms, the time data in each row may be accurate, but the data may be modified by the privacy module 220 before being provided by the privacy server 140 to another server. The privacy table 970 stores, for each directional data type, a corresponding privacy budget or epsilon values. Lower values for epsilon increase the privacy of the directional data but decrease the accuracy of the values reported by the privacy server 140.

Figure 10:
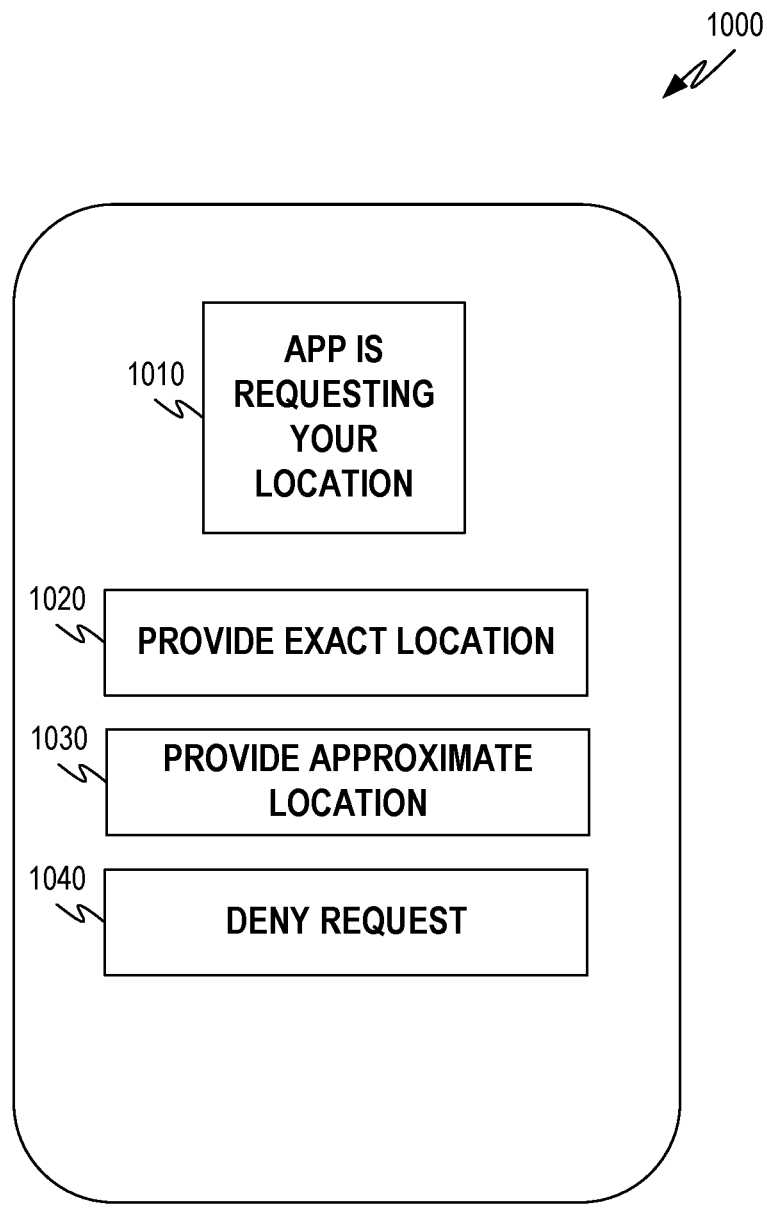
FIG. 10 is a block diagram of an example user interface that enables a user to provide true directional data or a modified directional data value that protects privacy.

FIG. 10 is a block diagram of an example user interface 1000 that enables a user to provide true directional data or a modified directional data value that protects privacy. The user interface 1000 includes an informational area 1010 and interactive elements 1020, 1030, and 1040.

The informational area 1010 indicates that an application is requesting location data of the user (e.g., as provided by a GPS device, triangulation of cell tower signals, accumulated motion read by gyroscopic sensors from a known location, or any suitable combination thereof). The user is presented the option to provide the exact location, using interactive element 1020, to provide an approximate location, using interactive element 1030, or to deny the request, using interactive element 1040.

If the user selects interactive element 1020, the exact location of the user is provided to the application (e.g., to the network-based application 110 via the network 150). In this case, if the user's directional privacy is protected, it will be by the privacy server 140.

In response to a user selection of interactive element 1030, only an approximate location of the user is provided to the application. For example, a location may be selected from a probability distribution on an (n-1)-sphere based on the true location of the user and a privacy parameter (e.g., the epsilon value in the privacy table 970 for the type of directional data being provided).

As a third option, the user may select interactive element 1040, denying the application's request for location data 1040 completely. Though the user interface 1000 regards location data, similar user interfaces may be used for other types of directional data. By use of the user interface 1000, the user is enabled to have finer-grained control over their data than with a simple allow/deny interface. As a result, applications may be granted access to privacy-protected directional data instead of being denied entirely, improving the functionality of the applications. Additionally or alternatively, users may grant access to privacy-protected directional data instead of exact directional data, improving the privacy of users.

Figure 11:
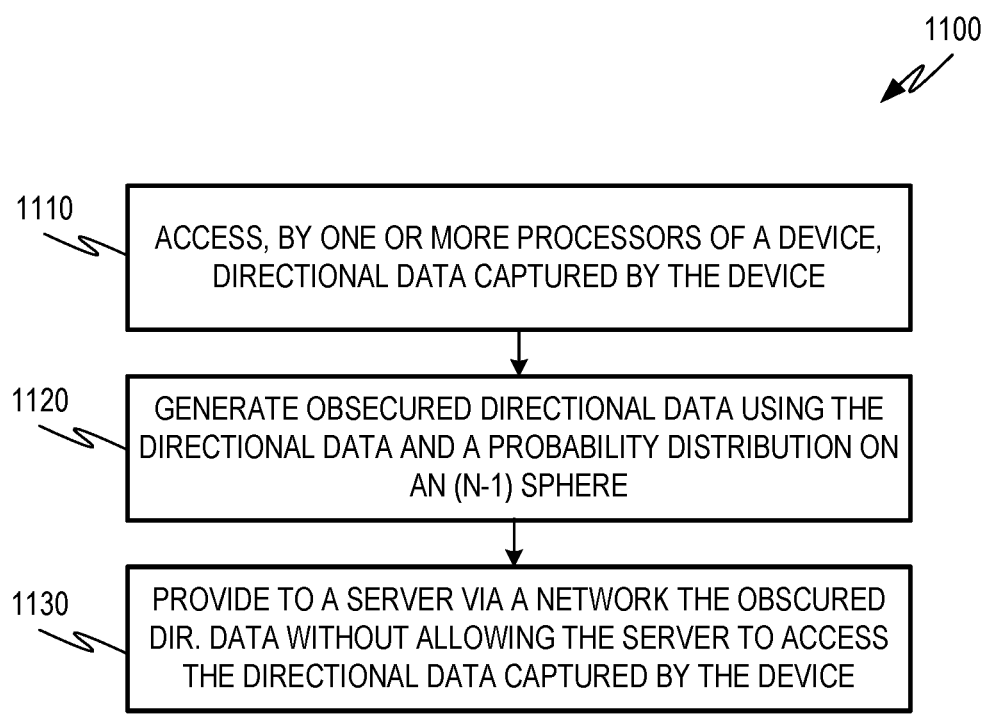
FIG. 11 is a flowchart illustrating operations of an example method suitable for protecting privacy of directional data.

FIG. 11 is a flowchart illustrating operations of an example method 1100 suitable for protecting privacy of directional data. The method 1100 includes operations 1110, 1120, and 1130. By way of example and not limitation, the method 1100 may be performed by one of the client computing devices 160, 161 of FIG. 1, in communication with the network-based application 110, using the modules, databases, structures, and user interfaces shown herein.

In operation 1110, one or more processors of the client computing device 160, 161 access units of directional data of the device. For example, a unit of directional data may indicate location data of the device that indicates the current location of the device, as reported by a GPS receiver.

The client computing device 160, 161, in operation 1120, generates modified directional data based on the directional data and a probability distribution on an (n-1) sphere. For example, a probability on the 2-sphere $S^2$ (a 3-dimensional sphere) based on a predetermined privacy parameter may be used to select from a set of locations centered on the current location of the device. The selected location is the modified directional data.

In operation 1130, the client computing device 160, 161 provides, to a server via a network (e.g., to the application server 120 via the network 150), the modified directional data without allowing the server to access the directional data of the device. Thus, the application server 120 is enabled to use the user's location data for aggregate metrics such as tracking traffic flow, but is not able to pinpoint the user's precise location, providing a measure of directional privacy to the user.

By way of example and not limitation, the operations 1110-1130 of the example method 1100 are described above as operating on location data (e.g., GPS data) of a 3-dimensional sphere. Alternatively or additionally, the operations 1110-1130 may operate on time of day data of a 2-dimensional circle, day of week data of a 2-dimensional circle, or location/orientation data of a 6-dimensional hypersphere.

Figure 12:
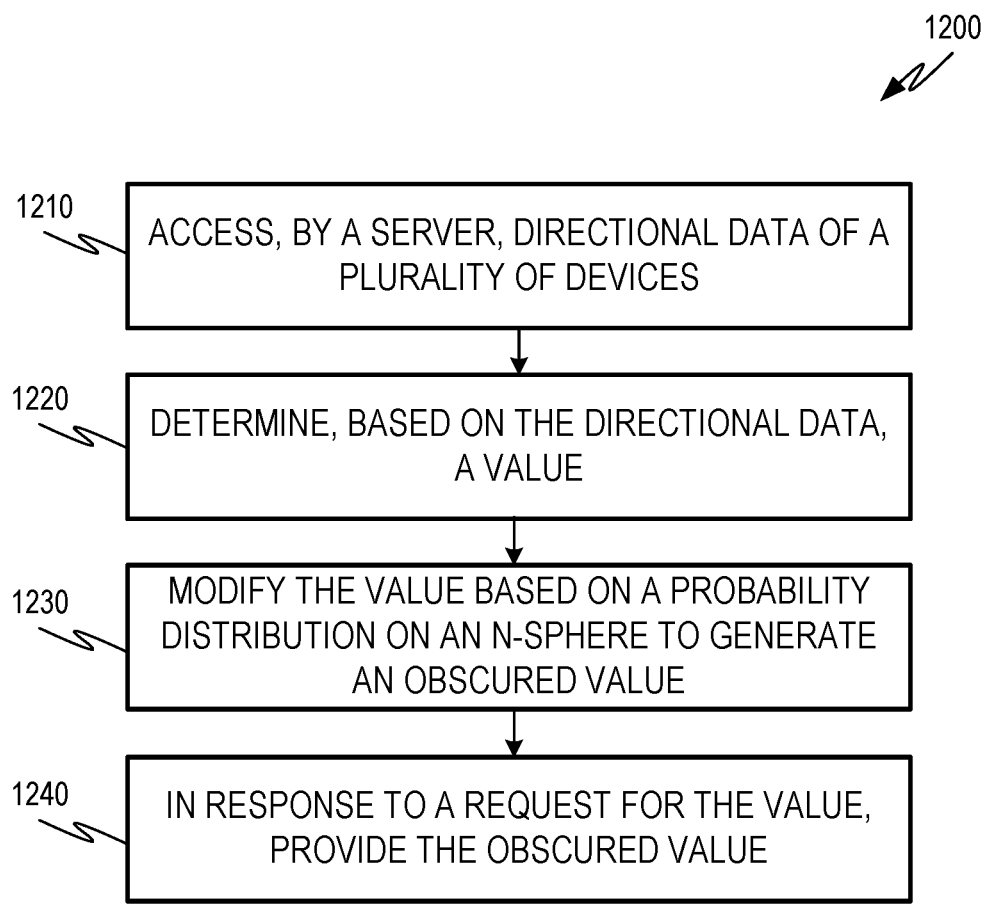
FIG. 12 is a flowchart illustrating operations of an example method suitable for protecting privacy of directional data.

FIG. 12 is a flowchart illustrating operations of an example method 1200 suitable for protecting privacy of directional data. The method 1200 includes operations 1210, 1220, 1230, and 1240. By way of example and not limitation, the method 1200 may be performed by the privacy server 140 of FIG. 1, using the modules, databases, structures, and user interfaces shown in FIGS. 2-7.

In operation 1210, a server (e.g., the privacy server 140) accesses directional data of a plurality of devices. For example, multiple client computing devices 160, 161 may have their directional data stored in the database server 130, using a database schema, such as the database schema 900 of FIG. 9. The privacy server 140 may execute a database query to select a set of the directional data (e.g., to select all location data for an identified period of time).

The server, in operation 1220, determines a value based on the directional data. For example, the directional data may be used to determine a mean, a median or any suitable combination thereof.

In operation 1230, the server obscures the determined value based on a probability distribution on an (n-1) sphere. For example, the probability distribution may identify a set of points with corresponding probabilities, centered on the determined value. A point is selected from the set of points, according to their respective probabilities, and the vector pointing from the center of the n-sphere to the selected point is used as the obscured value.

In response to a request for the value determined based on the directional data, the server instead provides the obscured value, at operation 1240. Thus, the provided directional data value is based on the actual directional data, but is not identical to the actual directional data, protecting the privacy of the individual contributors of the directional data. For example, a request for average location may be made after each individual piece of location data is provided to the application server 120. The provided average location, in each request, will be close to the actual average location, as determined by the probability distribution. However, reverse-engineering of the exact location of each contributing user will not be possible, providing differential privacy to the users.

By contrast, if an exact average value is taken from a database and the exact number of values contributing to that average is known, the value of a single additional record can be determined from an updated exact average value. For example, if the mean of a value is known to be 5 and the number of records is known to be 2 and, after adding a single record, the mean is now 6, hiding the value of the third record behind a statistical aggregation has not protected the value of the third record. The sum of the original two values was known to be 10 (such that the mean was 5) and the sum of the three values is known to be 18 (such that the mean is 6). Accordingly, the third value is 11. Thus, even when data is only provided in aggregated statistical form, differential privacy is not provided without adding some form of differential privacy protection.

EXAMPLES

In view of the above described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system for obscuring directional data to improve privacy, the system comprising: at least one processor programmed to perform operations comprising: accessing a first unit of directional data; selecting a sampled value from an angular cumulative distribution function (CDF) of a random distribution; using the selected sampled value and the first unit of directional data to generate a random sample from the random distribution; and generating aggregated dimensional data based at least in part on the first unit of directional data.

In Example 2, the subject matter of Example 1 optionally includes the random distribution being rotationally symmetric.

In Example 3, the subject matter of any one or more of Examples 1-2 optionally includes the random distribution having a probability density function that decays with surface distance from a mean direction of the random distribution.

In Example 4, the subject matter of any one or more of Examples 1-3 optionally includes the random distribution being a Purkayastha distribution.

In Example 5, the subject matter of any one or more of Examples 1-4 optionally includes the angular CDF being based on an integration of an angular density of the random distribution.

In Example 6, the subject matter of any one or more of Examples 1-5 optionally includes the generating of the random sample from the random distribution comprising approximating an inverse of the angular CDF at the selected sampled value.

In Example 7, the subject matter of any one or more of Examples 1-6 optionally includes the generating of the random sample from the random distribution comprising: determining, by the at least one processor, a midpoint of an interval angle; evaluating, by the at least one processor, the angular CDF at the midpoint of the interval angle; based on the angular CDF at the midpoint of the interval angle, selecting, by the at least one processor, an updated interval angle; determining, by the at least one processor, an updated midpoint of the updated interval angle; evaluating, by the at least one processor, the angular CDF at the updated midpoint of the updated interval angle; and based on the angular CDF of the updated midpoint of the updated interval angle, selecting, by the at least one processor, a second updated interval angle.

In Example 8, the subject matter of any one or more of Examples 1-7 optionally includes the applying the random sample to the first unit of directional data to generate a first obscured unit of directional data comprising: determining, by the at least one processor, a tangent-normal decomposition of the random sample; and applying, by the at least one processor, the tangent-normal decomposition of the random sample to the first unit of directional data.

In Example 9, the subject matter of any one or more of Examples 1-8 optionally includes the operations further comprising using the first obscured unit of directional data to train, by the at least one processor, a machine learning model.

In Example 10, the subject matter of any one or more of Examples 1-9 optionally includes the at least one processor being associated with a client computing device, the operations further comprising sending the first obscured unit of directional data to a server computing device.

In Example 11, the subject matter of any one or more of Examples 1-10 optionally includes the at least one processor being associated with a server computing device, the operations further comprising receiving the first unit of directional data from a client computing device.

Example 12 is a method for obscuring directional data to improve privacy, the method comprising: accessing, by at least one processor, a first unit of directional data; selecting, by the at least one processor, a sampled value from an angular cumulative distribution function (CDF) of a random distribution; using the selected sampled value and the first unit of directional data to generate, by the at least one processor, a random sample from the random distribution; and generating aggregated dimensional data based at least in part on the first unit of directional data.

In Example 13, the subject matter of Example 12 optionally includes the random distribution being rotationally symmetric.

In Example 14, the subject matter of any one or more of Examples 12-13 optionally includes the random distribution having a probability density function that decays with surface distance from a mean direction of the random distribution.

In Example 15, the subject matter of any one or more of Examples 12-14 optionally includes the random distribution being a Purkayastha distribution.

In Example 16, the subject matter of any one or more of Examples 12-15 optionally includes the angular CDF being based on an integration of an angular density of the random distribution.

In Example 17, the subject matter of any one or more of Examples 12-16 optionally includes the generating of the random sample from the random distribution comprising approximating an inverse of the angular CDF at the selected sampled value.

In Example 18, the subject matter of any one or more of Examples 12-17 optionally includes the generating of the random sample from the random distribution comprising: determining, by the at least one processor, a midpoint of an interval angle; evaluating, by the at least one processor, the angular CDF at the midpoint of the interval angle; based on the angular CDF at the midpoint of the interval angle, selecting, by the at least one processor, an updated interval angle; determining, by the at least one processor, an updated midpoint of the updated interval angle; evaluating, by the at least one processor, the angular CDF at the updated midpoint of the updated interval angle; and based on the angular CDF of the updated midpoint of the updated interval angle, selecting, by the at least one processor, a second updated interval angle.

In Example 19, the subject matter of any one or more of Examples 12-18 optionally includes the applying the random sample to the first unit of directional data to generate a first obscured unit of directional data comprising: determining, by the at least one processor, a tangent-normal decomposition of the random sample; and applying, by the at least one processor, the tangent-normal decomposition of the random sample to the first unit of directional data.

Example 20 is a non-transitory machine-readable medium comprising instructions thereon that, when executed by at least one processor, cause the at least one processor to perform operations comprising: accessing a first unit of directional data; selecting a sampled value from an angular cumulative distribution function (CDF) of a random distribution; using the selected sampled value and the first unit of directional data to generate a random sample from the random distribution; and generating aggregated dimensional data based at least in part on the first unit of directional data.

Figure 13:
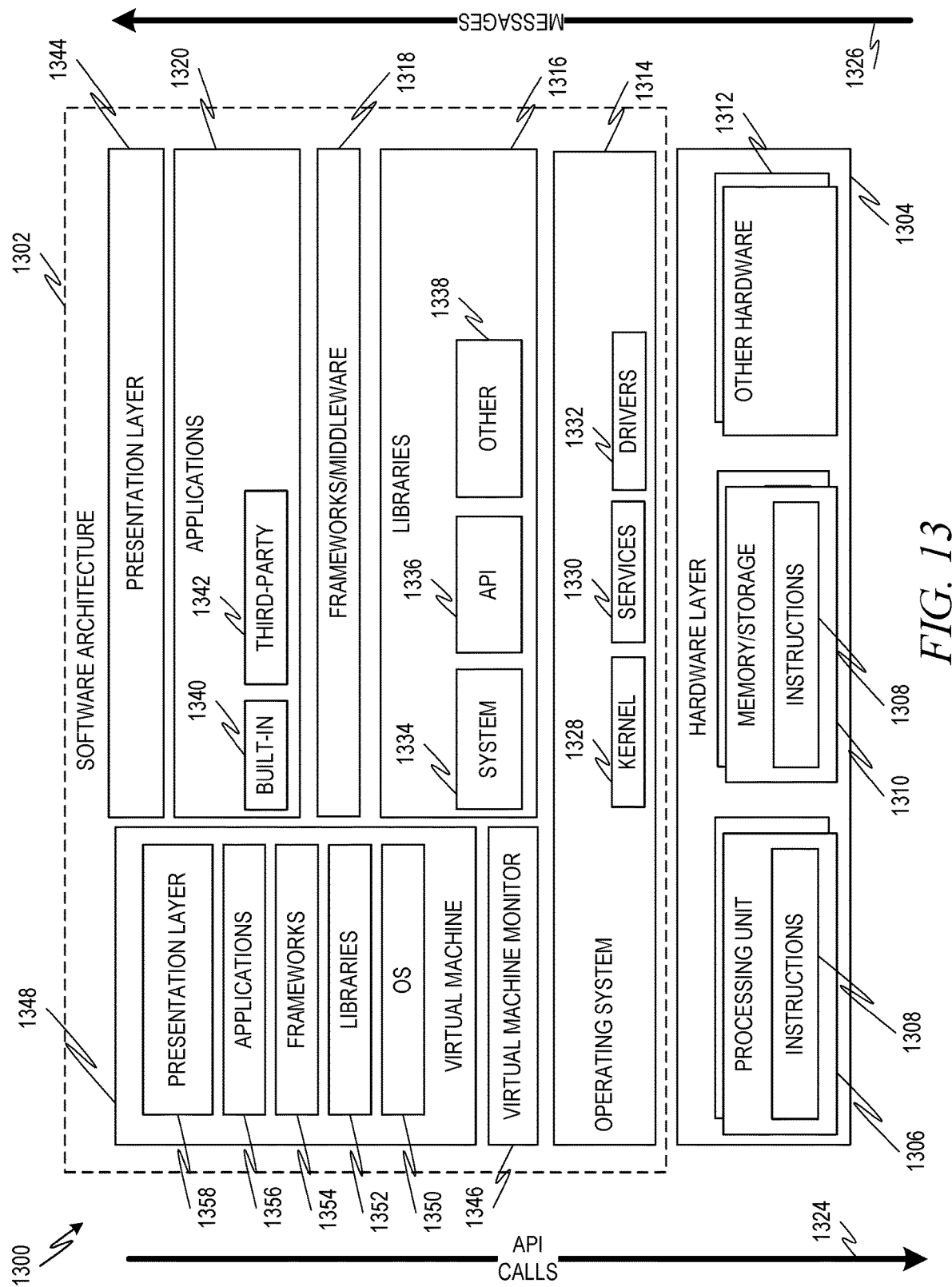
FIG. 13 is a block diagram showing one example of a software architecture for a computing device.

FIG. 13 is a block diagram 1300 showing one example of a software architecture 1302 for a computing device. The software architecture 1302 may be used in conjunction with various hardware architectures, for example, as described herein. FIG. 13 is merely a non-limiting example of a software architecture and many other architectures may be implemented to facilitate the functionality described herein. An example hardware layer 1304 is illustrated and can represent, for example, any of the above referenced computing devices. In some examples, the hardware layer 1304 may be implemented according to the architecture of the computer system of FIG. 13.

The hardware layer 1304 comprises one or more processing units 1306 having associated executable instructions 1308. Executable instructions 1308 represent the executable instructions of the software architecture 1302, including implementation of the methods, modules, subsystems, and components, and so forth described herein and may also include memory and/or storage modules 1310, which also have executable instructions 1308. Hardware layer 1304 may also comprise other hardware as indicated by other hardware 1312 which represents any other hardware of the hardware layer 1304, such as the other hardware illustrated as part of the software architecture 1302.

In the example architecture of FIG. 13, the software architecture 1302 may be conceptualized as a stack of layers where each layer provides particular functionality. For example, the software architecture 1302 may include layers such as an operating system 1314, libraries 1316, middleware 1318, applications 1320 and presentation layer 1344. Operationally, the applications 1320 and/or other components within the layers may invoke application programming interface (API) calls 1324 through the software stack and access a response, returned values, and so forth illustrated as messages 1326 in response to the API calls 1324. The layers illustrated are representative in nature and not all software architectures have all layers. For example, some mobile or special purpose operating systems may not provide middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. In some examples, the services 1330 include an interrupt service. The interrupt service may detect the receipt of an interrupt and, in response, cause the software architecture 1302 to pause its current processing and execute an interrupt service routine (ISR) when an interrupt is accessed.

The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the operating system 1314 functionality (e.g., kernel 1328, services 1330 and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1316 may also include a wide variety of other libraries 1338, such as machine learning libraries, to provide many other APIs to the applications 1320 and other software components/modules.

The middleware 1318 (also sometimes referred to as a frameworks layer) may provide a higher-level common infrastructure that may be utilized by the applications 1320 and/or other software components/modules. For example, the middleware 1318 may provide various graphic user interface (GUI) functions, high-level resource management, high-level location services, and so forth. The middleware 1318 may provide a broad spectrum of other APIs that may be utilized by the applications 1320 and/or other software components/modules, some of which may be specific to a particular operating system or platform.

The applications 1320 include built-in applications 1340 and/or third-party applications 1342. Examples of representative built-in applications 1340 may include, but are not limited to, a contacts application, a browser application, a book reader application, a location application, a media application, a messaging application, and/or a game application. Third-party applications 1342 may include any of the built in applications as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1342 may invoke the API calls 1324 provided by the mobile operating system such as operating system 1314 to facilitate functionality described herein.

The applications 1320 may utilize built in operating system functions (e.g., kernel 1328, services 1330 and/or drivers 1332), libraries (e.g., system libraries 1334, API libraries 1336, and other libraries 1338), middleware 1318 to create user interfaces to interact with users of the system. Alternatively, or additionally, in some systems interactions with a user may occur through a presentation layer, such as presentation layer 1344. In these systems, the application/module "logic" can be separated from the aspects of the application/module that interact with a user.

Some software architectures utilize virtual machines. In the example of FIG. 13, this is illustrated by virtual machine 1348. A virtual machine creates a software environment where applications/modules can execute as if they were executing on a hardware computing device. A virtual machine is hosted by a host operating system (operating system 1314) and typically, although not always, has a virtual machine monitor 1346, which manages the operation of the virtual machine as well as the interface with the host operating system (i.e., operating system 1314). A software architecture executes within the virtual machine 1348 such as an operating system 1350, libraries 1352, frameworks/middleware 1354, applications 1356 and/or presentation layer 1358. These layers of software architecture executing within the virtual machine 1348 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 14:
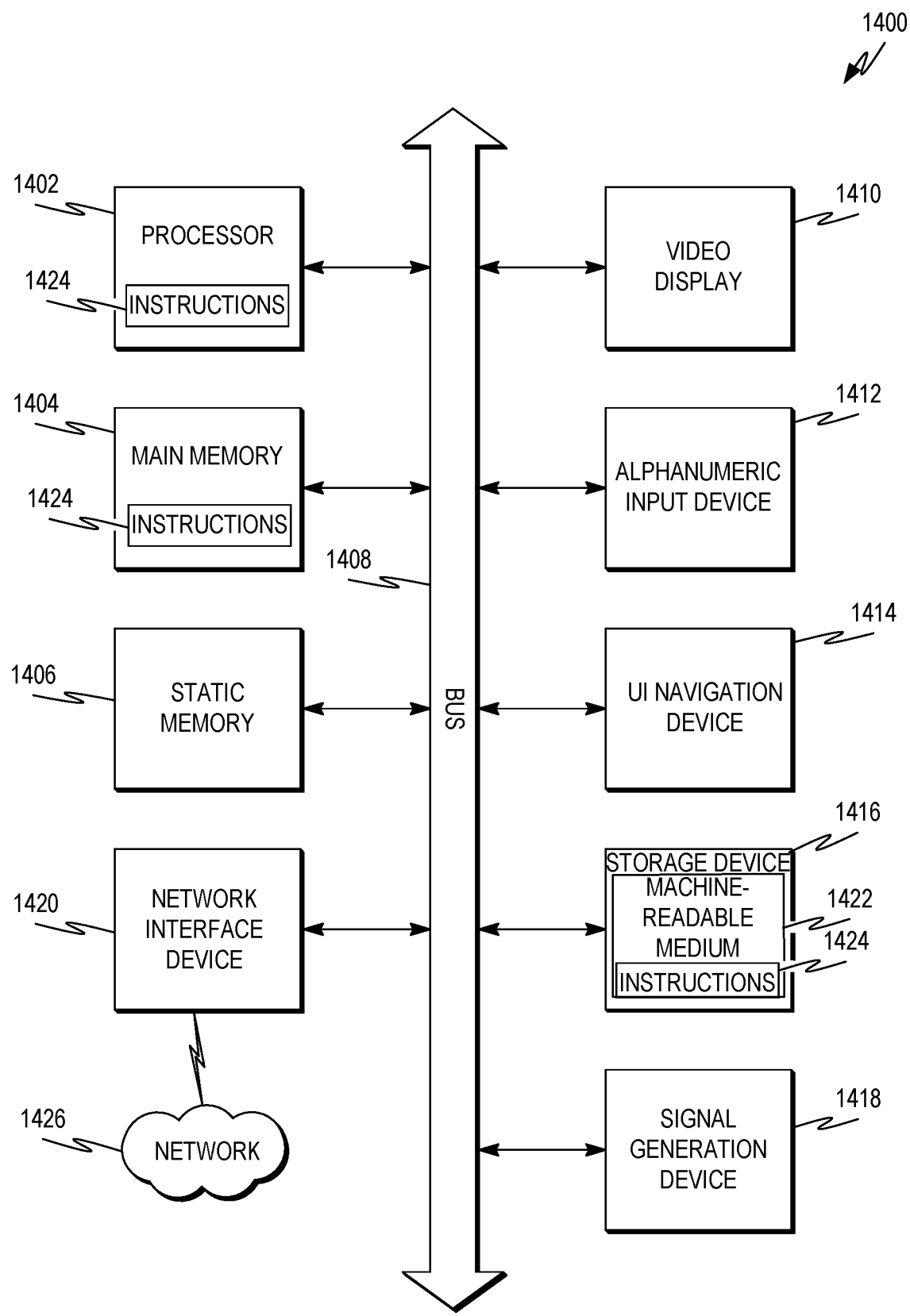
FIG. 14 is a block diagram of a machine in the example form of a computer system within which instructions may be executed for causing the machine to perform any one or more of the methodologies discussed herein.

FIG. 14 is a block diagram of a machine in the example form of a computer system 1400 within which instructions 1424 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU), or both), a main memory 1404, and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation (or cursor control) device 1414 (e.g., a mouse), a disk drive unit 1416, a signal generation device 1418 (e.g., a speaker), and a network interface device 1420.

Machine-Readable Medium

The disk drive unit 1416 includes a machine-readable medium 1422 thereon is stored one or more sets of data structures and instructions 1424 (e.g., software) embodying or utilized by any one or more of the methodologies or functions described herein. The instructions 1424 may also reside, completely or at least partially, within the main memory 1404 and/or within the processor 1402 during execution thereof by the computer system 1400, with the main memory 1404 and the processor 1402 also constituting machine-readable media 1422.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding, or carrying instructions 1424 for execution by the machine and that cause the machine to perform any one or more of the methodologies of the present disclosure, or that is capable of storing, encoding, or carrying data structures utilized by or associated with such instructions 1424. The term "machine-readable medium" shall accordingly be taken to include, but not be limited to, solid-state memories, and optical and magnetic media. Specific examples of machine-readable media 1422 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. A machine-readable medium is not a transmission medium.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1424 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for obscuring directional data, the system comprising:
    at least one processor programmed to perform operations comprising:
        receiving directional data from a client computing device, the directional data comprising a plurality of units of directional data captured by at least one sensor;
        selecting a first sampled value from an angular cumulative distribution function (CDF) of a random distribution;
        applying the first sampled value to a first unit of directional data from the plurality of units of directional data to generate a first obscured unit of directional data, the first obscured unit of directional data being an obscured representation of the first unit of dimensional data; and
        generating aggregated dimensional data based at least in part on a plurality of obscured units of directional data generated from the plurality of units of directional data, the plurality of obscured units of directional data comprising the first obscured unit of directional data.

2. The system of claim 1, the random distribution being rotationally symmetric.

3. The system of claim 1, the random distribution having a probability density function that decays with surface distance from a mean direction of the random distribution.

4. The system of claim 1, the random distribution being a Purkayastha distribution.

5. The system of claim 1, the angular CDF being based on an integration of an angular density of the random distribution.

6. The system of claim 1, the selecting of the first sampled value from the angular CDF of the random distribution comprising approximating an inverse of the angular CDF at the first sampled value.

7. The system of claim 1, the selecting of the first sampled value from the angular CDF of the random distribution comprising:
- determining, by the at least one processor, a midpoint of an interval angle;
- evaluating, by the at least one processor, the angular CDF at the midpoint of the interval angle;
- based on the angular CDF at the midpoint of the interval angle, selecting, by the at least one processor, an updated interval angle;
- determining, by the at least one processor, an updated midpoint of the updated interval angle;
- evaluating, by the at least one processor, the angular CDF at the updated midpoint of the updated interval angle; and
- based on the angular CDF of the updated midpoint of the updated interval angle, selecting, by the at least one processor, a second updated interval angle.

8. The system of claim 1, the applying of the first sampled value to the first unit of directional data to generate the first obscured unit of directional data comprising:
- determining, by the at least one processor, a tangent-normal decomposition of the first sampled value; and
- applying, by the at least one processor, the tangent-normal decomposition of the first sampled value to the first unit of directional data.

9. The system of claim 1, the operations further comprising using the first obscured unit of directional data to train, by the at least one processor, a machine learning model.

10. A method for obscuring directional sensor data, the method comprising:
- receiving, by at least one processor, directional data from a client computing device, the directional data comprising a plurality of units of directional data captured by at least one sensor;
- selecting, by the at least one processor, a first sampled value from an angular cumulative distribution function (CDF) of a random distribution;
- applying the first sampled value to a first unit of directional data from the plurality of units of directional data to generate, by the at least one processor, a first obscured unit of directional data, the first obscured unit of directional data being an obscured representation of the first unit of dimensional data; and
- generating aggregated dimensional data based at least in part on a plurality of obscured units of directional data generated from the plurality of units of directional data, the plurality of obscured units of directional data comprising the first obscured unit of directional data.

11. The method of claim 10, the random distribution being rotationally symmetric.

12. The method of claim 10, the random distribution having a probability density function that decays with surface distance from a mean direction of the random distribution.

13. The method of claim 10, the random distribution being a Purkayastha distribution.

14. The method of claim 10, the angular CDF being based on an integration of an angular density of the random distribution.

15. The method of claim 10, the selecting of the first sampled value from the random distribution comprising approximating an inverse of the angular CDF at the first sampled value.

16. The method of claim 10, the generating of the first sampled value from the random distribution comprising:
- determining, by the at least one processor, a midpoint of an interval angle;
- evaluating, by the at least one processor, the angular CDF at the midpoint of the interval angle;
- based on the angular CDF at the midpoint of the interval angle, selecting, by the at least one processor, an updated interval angle;
- determining, by the at least one processor, an updated midpoint of the updated interval angle;
- evaluating, by the at least one processor, the angular CDF at the updated midpoint of the updated interval angle; and
- based on the angular CDF of the updated midpoint of the updated interval angle, selecting, by the at least one processor, a second updated interval angle.

17. The method of claim 10, the applying the first sampled value to the first unit of directional data to generate a first obscured unit of directional data comprising:
- determining, by the at least one processor, a tangent-normal decomposition of the first sampled value; and
- applying, by the at least one processor, the tangent-normal decomposition of the first sampled value to the first unit of directional data.

18. A non-transitory machine-readable medium comprising instructions thereon that, when executed by at least one processor, cause the at least one processor to perform operations comprising:
- receiving directional data from a client computing device, the directional data comprising a plurality of units of directional data captured by at least one sensor;
- selecting a first sampled value from an angular cumulative distribution function (CDF) of a random distribution;
- applying the first sampled value to a first unit of directional data from the plurality of units of directional data to generate a first obscured unit of directional data, the first obscured unit of directional data being an obscured representation of the first unit of dimensional data; and
- generating aggregated dimensional data based at least in part on a plurality of obscured units of directional data generated from the plurality of units of directional data, the plurality of obscured units of directional data comprising the first obscured unit of directional data.

19. The non-transitory machine-readable medium of claim 18, the random distribution being rotationally symmetric.

20. The non-transitory machine-readable medium of claim 18, the random distribution having a probability density function that decays with surface distance from a mean direction of the random distribution.

* * * * *